US012738751B2

(12) United States Patent
Kim et al.

(10) Patent No.: US 12,738,751 B2
(45) Date of Patent: Sep. 15, 2026

(54) BATTERY SYSTEM AND CONTROLLING METHOD THEREOF

(71) Applicant: SAMSUNG ELECTRONICS CO., LTD., Suwon-si (KR)

(72) Inventors: Jeongwoo Kim, Suwon-si (KR); Shinho Kang, Suwon-si (KR); Moonyoung Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 19/020,216

(22) Filed: Jan. 14, 2025

(65) Prior Publication Data

US 2025/0253682 A1 Aug. 7, 2025

Related U.S. Application Data

(63) Continuation of application No. PCT/KR2024/020201, filed on Dec. 10, 2024.

(30) Foreign Application Priority Data

Feb. 5, 2024 (KR) ........................ 10-2024-0017495

(51) Int. Cl.
*H01M 10/46* (2006.01)
*H01M 10/42* (2006.01)
(Continued)

(52) U.S. Cl.
CPC ........... *H02J 7/585* (2026.01); *H01M 10/425* (2013.01); *H01M 10/441* (2013.01);
(Continued)

(58) Field of Classification Search
CPC .... H02J 7/0025; H02J 7/0047; H02J 7/00712; H02J 2207/20; H01M 10/425;
(Continued)

(56) References Cited

U.S. PATENT DOCUMENTS 7,914,917 B2 3/2011 Nakashima et al.
8,047,316 B2 11/2011 Takami et al.
(Continued)

FOREIGN PATENT DOCUMENTS

EP 4 379 407 A1 6/2024
JP 2004-357481 A 12/2004
(Continued)

OTHER PUBLICATIONS

Communication dated Mar. 27, 2025, issued by the International Searching Authority in International Application No. PCT/KR2024/020201 (PCT/ISA/210 and PCT/ISA/237).

*Primary Examiner* — Menatoallah Youssef
*Assistant Examiner* — Michael J Warmflash
(74) *Attorney, Agent, or Firm* — Sughrue Mion, PLLC

(57) ABSTRACT

Provided is a battery system, including a first battery pack including a first battery cell, a second battery pack including a second battery cell, a charger, and at least one processor configured to control the charger to sequentially perform constant current (CC) charging on the second battery pack and the first battery pack based on input power being identified, and control the charger to sequentially perform constant voltage (CV) charging on the second battery pack and the first battery pack based on the CC charging of the second battery pack and the first battery pack being completed, wherein a discharging performance of the first battery pack is greater than a discharging performance of the second battery pack, and wherein a charging performance of the second battery pack is greater than a charging performance of the first battery pack.

17 Claims, 13 Drawing Sheets

(51) Int. Cl.
*H01M 10/44* (2006.01)
*H02J 7/50* (2026.01)
*H02J 7/80* (2026.01)
*H02J 7/90* (2026.01)

(52) U.S. Cl.
CPC ............... *H01M 10/46* (2013.01); *H02J 7/80* (2026.01); *H02J 7/933* (2026.01); *H01M 2010/4271* (2013.01); *H01M 2010/4278* (2013.01); *H02J 2207/20* (2020.01)

(58) Field of Classification Search
CPC ............... H01M 10/441; H01M 10/46; H01M 2010/4271; H01M 2010/4278
See application file for complete search history.

(56) References Cited

U.S. PATENT DOCUMENTS

| | | | | |
|---|---|---|---|---|
| 10,933,823 | B2 | 3/2021 | Akuzawa | |
| 12,489,308 | B2 * | 12/2025 | Chen | H02J 7/50 |
| 2005/0001593 | A1 * | 1/2005 | Kawasumi | H02J 7/50 320/132 |
| 2013/0113417 | A1 | 5/2013 | Nakashima | |
| 2018/0198175 | A1 | 7/2018 | Yamauchi et al. | |
| 2020/0070753 | A1 * | 3/2020 | Akuzawa | B60L 1/10 |
| 2020/0266627 | A1 * | 8/2020 | Ha | H02J 1/106 |
| 2021/0320504 | A1 * | 10/2021 | Choi | H02J 7/52 |
| 2022/0181889 | A1 * | 6/2022 | Choi | H02J 7/54 |
| 2022/0407344 | A1 * | 12/2022 | Cha | H02J 7/342 |
| 2023/0253815 | A1 * | 8/2023 | Tomizawa | H02J 7/96 320/128 |
| 2023/0369663 | A1 * | 11/2023 | Hong | H01M 10/44 |
| 2024/0120764 | A1 | 4/2024 | Heinrich et al. | |
| 2024/0243371 | A1 * | 7/2024 | Kim | H01M 10/425 |
| 2024/0356437 | A1 * | 10/2024 | Paparrizos | H02J 7/90 |
| 2025/0233439 | A1 * | 7/2025 | Ding | H02J 7/96 |

FOREIGN PATENT DOCUMENTS

| | | | |
|---|---|---|---|
| JP | 4413888 | B2 | 2/2010 |
| JP | 2010-282878 | A | 12/2010 |
| JP | 2013-102625 | A | 5/2013 |
| JP | 2023-42959 | A | 3/2023 |
| JP | 2023-119491 | A | 8/2023 |
| KR | 10-1275407 | B1 | 6/2013 |
| KR | 10-2253328 | B1 | 5/2021 |
| KR | 10-2021-0156052 | A | 12/2021 |
| KR | 10-2521665 | B1 | 4/2023 |
| KR | 10-2023-0070956 | A | 5/2023 |
| KR | 10-2023-0070957 | A | 5/2023 |
| KR | 10-2023-0105425 | A | 7/2023 |

* cited by examiner

100'
1 PS ON/OFF
MONITOR OUTPUT CURRENT OF FIRST LOAD
141
FIRST DC/DC CONVERTER
1 DC/DC control
130
PROCESSOR
111
Q6
120
1 BMS
Charger
R1
Q2
FIRST LOAD
Q3
R2
Q1
150
Q7
Q4
1 battery information
Charge Control
MONITOR CHARGING INPUT CURRENT
MONITOR OUTPUT CURRENT OF SECOND LOAD
112
2 BMS
SECOND DC/DC CONVERTER
142
R3
Q5
SECOND LOAD
2 battery information
2 DC/DC Control
2 PS ON/OFF

BATTERY SYSTEM AND CONTROLLING METHOD THEREOF

CROSS-REFERENCE TO RELATED APPLICATION(S)

This application is a bypass continuation of International Application No. PCT/KR2024/020201 filed on Dec. 10, 2024, which is based on and claims priority to Korean Patent Application No. 10-2024-0017495, filed on Feb. 5, 2024, in the Korean Intellectual Property Office, the disclosures of which are incorporated by reference herein in their entireties.

BACKGROUND

1. Field

Embodiments of the present disclosure relate to a battery system and a controlling method thereof, and more particularly, to a battery system that charges and discharges a plurality of battery packs and a controlling method thereof.

2. Description of the Related Art

With the development of electronic technology, various types of electronic devices have been developed and spread. Accordingly, the development of secondary batteries, which are a power source used in these electronic devices, is accelerating.

SUMMARY

According to an aspect of one or more embodiments, there is provided a battery system, including a first battery pack including a first battery cell, a second battery pack including a second battery cell, a charger, and at least one processor configured to control the charger to sequentially perform constant current (CC) charging on the second battery pack and the first battery pack based on input power being identified, and control the charger to sequentially perform constant voltage (CV) charging on the second battery pack and the first battery pack based on the CC charging of the second battery pack and the first battery pack being completed, wherein a discharging performance of the first battery pack is greater than a discharging performance of the second battery pack, and wherein a charging performance of the second battery pack is greater than a charging performance of the first battery pack.

The battery system may further include a first DC/DC converter, for a first load, connected to the first battery pack, and a second DC/DC converter, for a second load, connected to the second battery pack, wherein the at least one processor is further configured to turn on the first DC/DC converter and turn on the second DC/DC converter to sequentially discharge the second battery pack and the first battery pack based on the input power being not identified.

The battery system may further include a power supplier, a first switching element connected between the power supplier and the charger, a first resistance connected to a first terminal of the first DC/DC converter, a second switching element connected to the first resistance, a third switching element connected between the first terminal of the first DC/DC converter and the charger, a fourth switching element connected between a first terminal of the second DC/DC converter and the charger, a second resistance connected to a first terminal of the first switching element between the third switching element and the fourth switching element, a third resistance connected to the first terminal of the second DC/DC converter, and a fifth switching element connected to the third resistance.

The battery system may further include a sixth switching element connected between the first DC/DC converter and the charger, and a seventh switching element connected between the other terminal of the second DC/DC converter and the charger, wherein the first battery pack is connected between a second terminal of the first DC/DC converter and the sixth switching element, and wherein the second battery pack is connected between the second terminal of the second DC/DC converter and the seventh switching element.

The at least one processor may be further configured to monitor an output current of the first load connected to a second terminal of the second switching element through the first resistance connected to a first terminal of the second switching element, monitor an output current of the second load connected to a second terminal of the fifth switching element through the third resistance connected to the first terminal of the fifth switching element, and control the first battery pack and the second battery pack to be discharged based on the output current of the first load and the output current of the second load.

The first load may be a load greater than or equal to a critical size, and the second load may be a load less than the critical size.

The at least one processor may be further configured to control the charger to perform the CC charging on the second battery pack by turning on the first switching element, turning off the second switching element, the third switching element, the fourth switching element, and the fifth switching element, and turning off the sixth switching element and turning on the seventh switching element based on the input power being identified, control the charger to perform the CC charging on the first battery pack by turning on the sixth switching element and turning off the seventh switching element based on the CC charging of the second battery pack being completed, control the charger to perform the CV charging on the second battery pack by turning off the sixth switching element and turning on the seventh switching element based on the CC charging of the first battery pack being completed, and control the charger to perform the CV charging on the first battery pack by turning on the sixth switching element and turning off the seventh switching element based on the CV charging of the second battery pack being completed.

Based on a section where the input power is identified and a section where the input power is not identified being repeated, the at least one processor may be further configured to control the charger to perform the CC charging on the first battery pack by turning on the first switching element and the sixth switching element and turning off the second switching element, the third switching element, the fourth switching element, the fifth switching element, and the seventh switching element, in a section where the input power is identified, and control the charger to perform the CC charging on the second battery pack and discharge the first battery pack by turning on the second switching element, the third switching element, the fourth switching element, the fifth switching element, and the seventh switching element and turning off the first switching element and the sixth switching element, in a section where the input power is not identified.

The at least one processor may be further configured to turn off the first switching element, the third switching element, and the fourth switching element and turn on the second switching element and the fifth switching element, based on the output current of the first load and the output current of the second load being identified, turn on the sixth switching element and turn off the seventh switching element to discharge the first battery pack, based on the output current being less than reference power, and turn off the sixth switching element and turn on the seventh switching element to discharge the second battery pack, based on the output current being higher than or equal to the reference power.

The first battery pack may include a first battery management device configured to obtain status information of the first battery cell, the second battery pack may include a second battery management device configured to obtain status information of the second battery cell, and wherein the at least one processor may be further configured to monitor battery status information received from the first battery management device and the second battery management device, and control the CC charging and the CV charging of the first battery pack and the second battery pack based on the monitoring result.

According to another aspect of one or more embodiments, there is provided a controlling method of a battery system including a first battery pack that includes a first battery cell and a second battery pack that includes a second battery cell, the controlling method including sequentially performing constant current (CC) charging on the second battery pack and the first battery pack based on input power being identified, and sequentially performing constant voltage (CV) charging on the second battery pack and the first battery pack based on the CC charging of the second battery pack and the first battery pack being completed, wherein a discharging performance of the first battery pack is greater than a discharging performance of the second battery pack, and wherein a charging performance of the second battery pack is greater than a charging performance of the first battery pack.

The controlling method may further include sequentially discharging the second battery pack and discharging the first battery pack by turning on a first DC/DC converter for a first load connected to the first battery pack and a second DC/DC converter for a second load connected to the second battery pack, based on input power being not identified.

The battery system may further include a first switching element connected between a power supplier and a charger, a first resistance connected to a first terminal of the first DC/DC converter, a second switching element connected to the first resistance, a third switching element connected between the first terminal of the first DC/DC converter and the charger, a fourth switching element connected between a first terminal of the second DC/DC converter and the charger, a second resistance connected to a first terminal of the first switching element between the third switching element and the fourth switching element, a third resistance connected to the first terminal of the second DC/DC converter, a fifth switching element connected to the third resistance, a sixth switching element connected between the first DC/DC converter and the charger, and a seventh switching element connected between a second terminal of the second DC/DC converter and the charger, wherein the first battery pack is connected between a second terminal of the first DC/DC converter and the sixth switching element, and wherein the second battery pack is connected between the second terminal of the second DC/DC converter and the seventh switching element.

The controlling method may further include monitoring an output current of a first load connected to a second terminal of the second switching element through the first resistance connected to a first terminal of the second switching element, monitoring an output current of a second load connected to a second terminal of the fifth switching element through the third resistance connected to the first terminal of the fifth switching element, and controlling the first battery pack and the second battery pack to be discharged based on the output current of the first load and the output current of the second load.

According to still another aspect of one or more embodiments, there is provided a non-transitory computer-readable medium storing computer instructions that, when executed by a processor of a battery system including a first battery pack that includes a first battery cell and a second battery pack that includes a second battery cell, causes the battery system to operate, wherein the operation includes sequentially performing constant current (CC) charging on the second battery pack and the first battery pack based on input power being identified, and sequentially performing constant voltage (CV) charging on the first battery pack and the second battery pack based on the CC charging of the second battery pack and the first battery pack being completed, wherein a discharging performance of the first battery pack is greater than a discharging performance of the second battery pack, and wherein a charging performance of the second battery pack is greater than a charging performance of the first battery pack.

The operation may further include sequentially discharging the second battery pack and discharging the first battery pack by turning on a first DC/DC converter for a first load connected to the first battery pack and a second DC/DC converter for a second load connected to the second battery pack, based on input power being not identified.

The battery system may further include a first switching element connected between a power supplier and a charger, a first resistance connected to a first terminal of the first DC/DC converter, a second switching element connected to the first resistance, a third switching element connected between the first terminal of the first DC/DC converter and the charger, a fourth switching element connected between a first terminal of the second DC/DC converter and the charger, a second resistance connected to a first terminal of the first switching element between the third switching element and the fourth switching element, a third resistance connected to the first terminal of the second DC/DC converter, a fifth switching element connected to the third resistance, a sixth switching element connected between the first DC/DC converter and the charger, and a seventh switching element connected between a second terminal of the second DC/DC converter and the charger, wherein the first battery pack is connected between a second terminal of the first DC/DC converter and the sixth switching element, and wherein the second battery pack is connected between the second terminal of the second DC/DC converter and the seventh switching element.

The operation may further include monitoring an output current of a first load connected to a second terminal of the second switching element through the first resistance connected to a first terminal of the second switching element, monitoring an output current of a second load connected to a second terminal of the fifth switching element through the third resistance connected to the first terminal of the fifth switching element, and controlling the first battery pack and the second battery pack to be discharged based on the output current of the first load and the output current of the second load.

BRIEF DESCRIPTION OF THE DRAWINGS

The above and other aspects, features and advantages of characteristic one or more embodiments of the present disclosure will become more apparent from the following description in conjunction with the accompanying drawings.

DETAILED DESCRIPTION

Figure 1A:
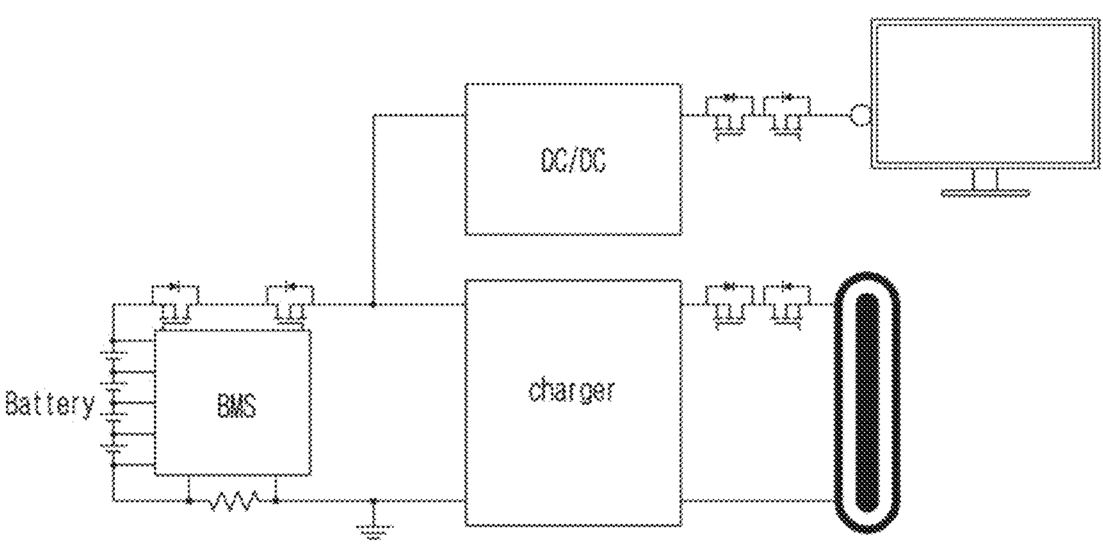
FIGS. 1A, 1B, 1C, and 1D are diagrams for describing an operation of a heterogeneous battery.

After terms used in the specification are schematically described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure are to be defined on the basis of the meaning of the terms and the contents throughout the disclosure rather than simple names of the terms.

In the specification, an expression "have", "may have", "include", "may include", or the like, indicates existence of a corresponding feature (e.g., a numerical value, a function, an operation, a component such as a part, or the like), and does not exclude existence of an additional feature.

In the disclosure, an expression "A or B", "at least one of A and/or B", or "one or more of A and/or B", may include all possible combinations of items enumerated together. For example, "A or B", "at least one of A and B", or "at least one of A or B" may indicate all of 1) a case where only A is included, 2) a case where only B is included, or 3) a case where both of the A and B are included.

Expressions "first," "second," "$1^{st}$" or "$2^{nd}$" or the like, used in the present disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

An expression "configured (or set) to" used in the disclosure may be replaced by an expression "suitable for", "having the capacity to" "designed to", "adapted to", "made to", or "capable of" depending on a situation. A term "configured (or set) to" may not necessarily indicate "specifically designed to" in hardware.

In some situations, an expression "a device configured to" may indicate that the device may "do" together with other devices or components. For example, a "processor configured (or set) to perform A, B, and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory device.

Singular forms include plural forms unless the context clearly indicates otherwise. It should be understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In exemplary embodiments, a 'module' or a 'unit' may perform at least one function or operation, and be implemented by hardware or software or be implemented by a combination of hardware and software. In addition, a plurality of "modules" or a plurality of "units" may be integrated in at least one module and be implemented by at least one processor except for a "module" or a "unit" that needs to be implemented by specific hardware.

Various elements and regions in the drawings are schematically illustrated. Therefore, the spirit of the disclosure is not limited by relatively sizes or intervals illustrated in the accompanying drawings.

Hereinafter, an embodiment of the disclosure will be described in detail with reference to the accompanying drawings.

FIGS. 1A to 1D are diagrams for describing an operation of a heterogeneous battery.

As the usage of batteries increases, characteristics of batteries are being developed to match characteristics of product groups. For example, batteries with relatively good (or high) discharging performance (or discharge characteristics) for high-power motors are applied to electric vehicles, and batteries with relatively good (or high) charging performance (or charge characteristics) are applied to devices such as laptops and mobile terminals.

Figure 1B:
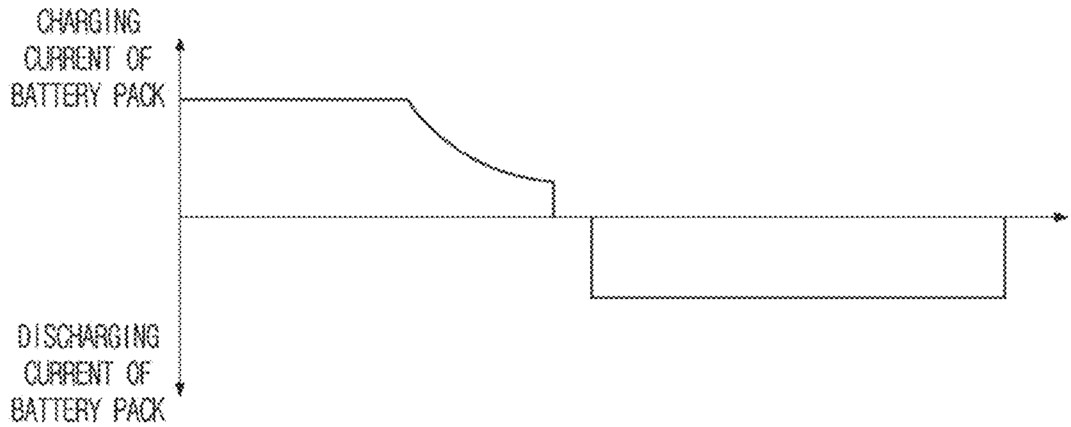

FIGS. 1A and 1B are diagrams for describing an operation of a battery with relatively high charging performance according to an example.

According to FIG. 1A, a battery with relatively good charging performance may be mainly used in devices such as, for example, laptops or portable terminals. According to FIG. 1B, a charging current of the battery with relatively good charging performance may be greater than a discharging current, so the charging performance is more improved than the discharging performance.

Figure 1C:
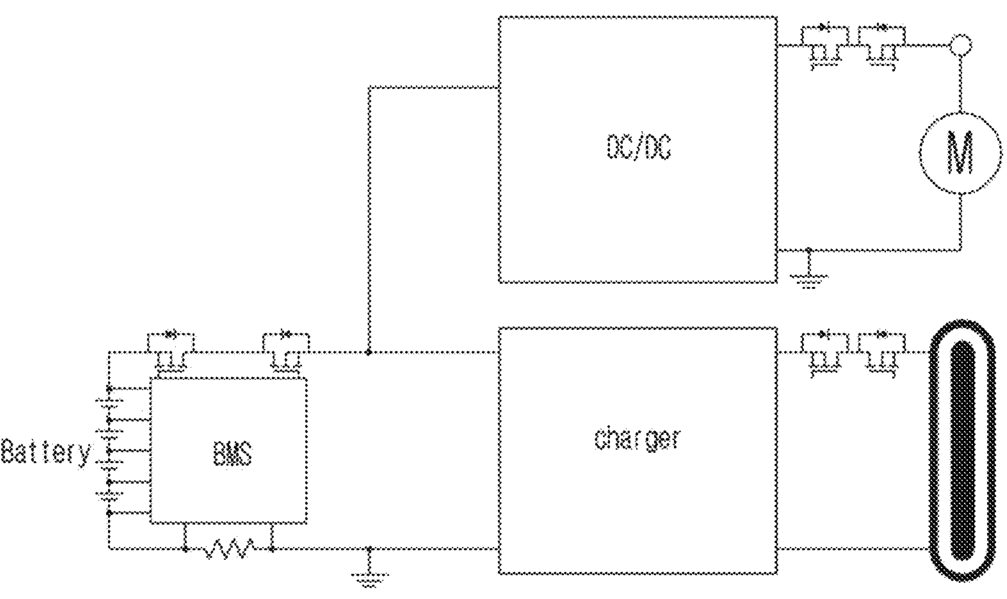
Figure 1D:
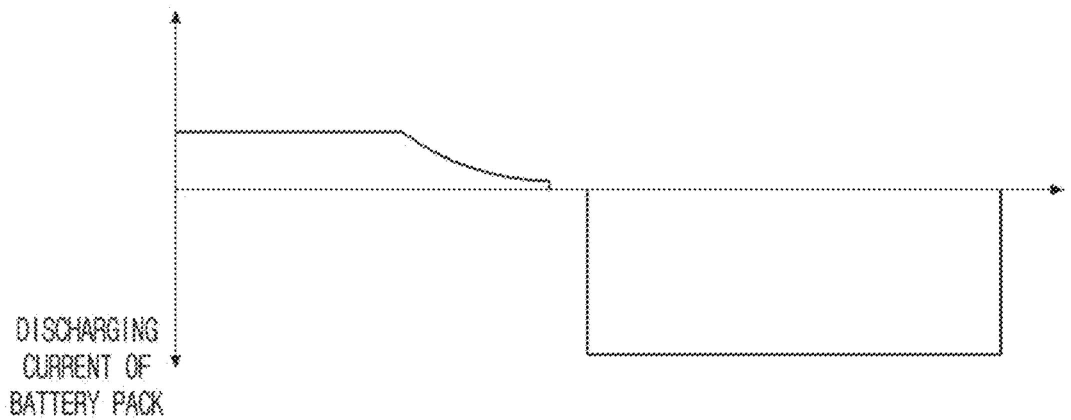

FIGS. 1C and 1D are diagrams for describing an operation of the battery with high charging performance according to an example.

According to FIG. 1C, the battery with relatively good discharging performance may be mainly used in devices such as relatively high-power motors. Referring to FIG. 1D, the discharging current of the battery with relatively good discharging performance may be greater than the charging current, such that the discharging performance is relatively higher than the charging performance.

When a user requires quick charging and uses the battery with relatively good charging characteristics, the discharging characteristics may not be good, and when the battery with relatively good discharging characteristics is applied to products requiring relatively high output, the charging characteristics are may not be good.

Accordingly, various embodiments for securing and controlling battery safety through charging/discharging control of different loads and different types of batteries with different characteristics will be described below.

Figure 2:
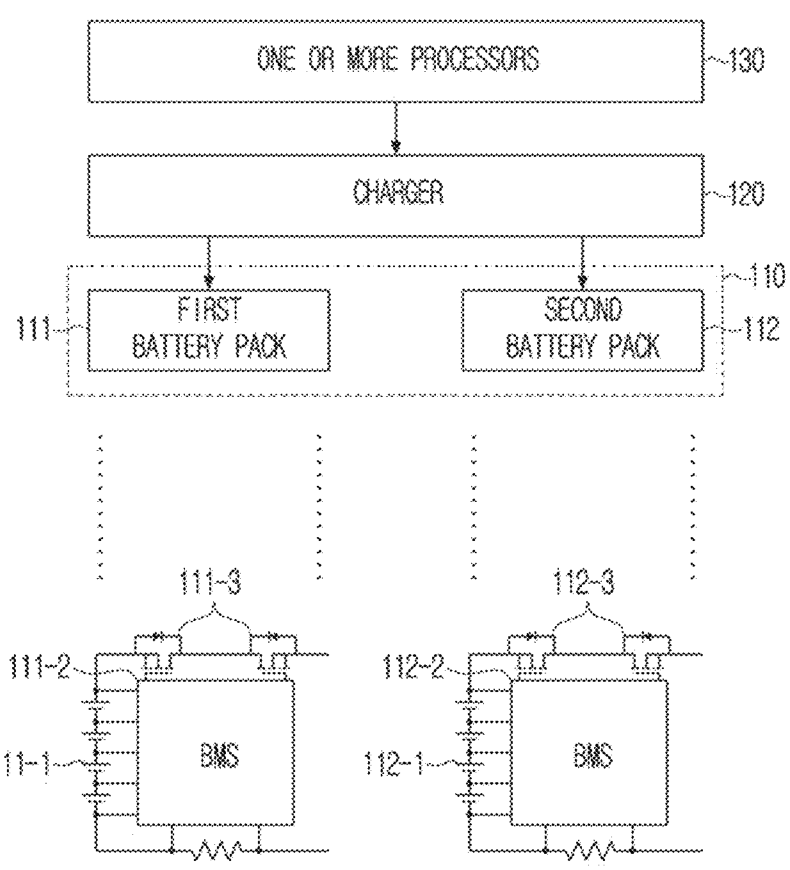
FIG. 2 is a block diagram illustrating a configuration of a battery system according to one or more embodiments.

FIG. 2 is a block diagram illustrating a configuration of a battery system according to one or more embodiments.

Referring to FIG. 2, a battery system 100 includes a battery pack 110, a charger 120, and one or more processors 130.

The battery system 100 may be implemented to charge and discharge a plurality of battery packs 110. The battery pack means a device that combines a plurality of battery cells into one to protect the battery cells from physical impact from an external environment and to perform a specific role.

According to an example, the battery pack 110 may include a plurality of battery packs. For example, as illustrated in FIG. 2, the battery pack 110 may include a first battery pack 111 and a second battery pack 112.

The first battery pack 111 may include a first battery cell 111-1. The first battery pack 111 may be implemented to perform a specific operation by including various configurations together with the first battery cell 111-1. According to an example, the first battery pack 111 may include the first battery cell 111-1, a battery management module (managing device) 111-2, and a switching element 111-3. The first battery cell 111-1 may store supplied electrical energy by changing the electrical energy into a form of chemical energy, and may then change the chemical energy into a form of the electrical energy and provide the electrical energy to supply power to a load.

The battery cell 111-1 is an individual battery included in the first battery pack 111, and the battery cell 111-1 may be a secondary battery that may be reused through charging even after being discharged. For example, the battery cell 111-1 may be a lithium ion battery. For example, the battery cell 111-1 may be a battery cell such as lithium nickel cobalt manganese oxide (NCM, $LiNiCoMnO_2$), LFP-lithium iron phosphate ($LiFePO_4/C$), LNMO-lithium nickel manganese spinel ($LiNi_{0.5}Mn_{1.5}O_4$), and lithium nickel cobalt aluminum oxide (NCA, $LiNiCoAlO_2$). However, embodiments are not limited thereto, and there is no particular limitation on the type of the battery cell 111-1. The battery cell 111-1 may refer to a component in which a plurality of battery cells are connected as illustrated in FIG. 2, but a battery cell may refer to one or more battery cells.

The battery management module 111-2 may acquire information on the state of the first battery cell 111-1. The battery management module 111-2 may detect the remaining capacity of the first battery cell 111-1 and whether the battery cell 121 fails, and transmit status information, such as the information on the remaining capacity and the information on whether the battery cell 121 fails, to one or more processors 130. In addition, the battery management module 111-2 may monitor the status, such as the voltage and current of the first battery cell 111-1. The battery management module 111-2 may be referred to as a battery management system (BMS).

The switching element 111-3 may be a component for opening and closing the charging or discharging of the first battery cell 111-1. As in the example of FIG. 2, the switching element 111-3 may be implemented in two and may operate according to a switching signal. For example, one or more processors 130 may transmit a switching signal for controlling the switching element 111-3 connected to the first battery cell 111-1 to the battery management module 111-2, and accordingly, the switching element 111-3 may be turned ON or OFF.

The second battery pack 112 may include a second battery cell 112-1. The second battery pack 112 may be implemented to perform a specific operation by including various configurations together with the second battery cell 112-1. According to an example, the second battery pack 112 may include the second battery cell 111-2, a battery management module 112-2, and a switching element 112-3. The structure and operation of the battery cell 112-1, the battery management module 112-2, and the switching element 112-3 that are included in the second battery pack 112 are identical/similar to the structure and operation of the battery cell 111-1, the battery management module 111-2, and the switching element 111-3 that are included in the first battery pack 111, and therefore, a redundant description thereof will be omitted.

According to an embodiment, the first battery pack 111 and the second battery pack 112 may be implemented as battery packs of different types (or different kinds). According to an example, the first battery pack 111 may be implemented to have relatively higher discharging performance than the second battery pack 112, and the second battery pack 112 may be implemented to have relatively higher charging performance than the first battery pack 111.

In the above-described embodiment, the first battery pack 111 and the second battery pack 112 are described as including the battery cell, the battery management module, and the switching element, respectively. However, embodiments are not limited thereto, and components that do not affect the operation according to the present disclosure may be added or the existing components may be changed. For example, the first battery pack 111 and the second battery pack 112 may include various control and/or protection devices such as a cooling device.

In FIG. 2, the plurality of battery packs 110 are illustrated as including two battery packs, the first battery pack 111 and the second battery pack 112, but are not limited thereto. There is no particular limitation on the number of the plurality of battery packs 110 according to the embodiments, and even when the number of the plurality of battery packs 120 is greater than or equal to three, various embodiments described below may be applied in the same or similar manner.

The charger 120 may charge the battery. For example, the charger 120 may include a charging circuit for charging the battery. As the charging circuit, various forms of related charging circuit may be used. The number of chargers included in the charger 120 may be one or implemented as a plurality of chargers, and there is no special limitation on the specifications including the maximum output of the charger.

One or more processors 130 (hereinafter referred to as a processor) may control the overall operation of the battery system 100 according to the embodiments.

The processor 130 may be implemented in various manners. For example, the processor 130 may be implemented as a micro-computer (MICOM), but is not limited thereto. For example, the processor 130 may be implemented by at least one of a micro-processor based controller, an application specific integrated circuit (ASIC), an embedded processor, a microprocessor, a hardware control logic, a hardware finite state machine (FSM), or a digital signal processor (DSP). According to embodiments, the term processor 130 may be used as meaning including a central processing unit (CPU), a graphic processing unit (GPU), a micro processing unit (MPU), and the like.

According to one or more embodiments, when input power is identified, the processor 130 may control the charger 120 to sequentially perform constant current (CC) charging of the second battery pack 112 and the first battery pack 111. According to an example, the second battery pack 112 may be implemented to have higher charging performance than the first battery pack 111, and the first battery pack 111 may be implemented to have higher discharging performance than the second battery pack 112.

According to one or more embodiments, when the CC charging of the second battery pack 112 and the first battery pack 111 is completed, the processor 130 may control the charger 120 to sequentially perform constant voltage (CV) charging of the second battery pack 112 and the first battery pack 111.

According to one or more embodiments, the processor 130 may monitor battery status information received from the first battery management module 111-2 and the second battery management module 112-2 and control the CC charging and CV charging of the first battery cell 111-1 and the second battery cell 112-1 based on the monitoring result.

According to an example, the processor 130 may perform the CC charging of the second battery cell 112-1 by transmitting a switching signal (e.g., an ON signal) for controlling the switching element 112-3 included in the second battery pack 112 to the second battery management module 112-2.

According to an example, when receiving status information indicating that the CC charging of the second battery cell 112-1 is completed from the second battery management module 112-2, the processor 130 may initiate the CC charging of the first battery pack 111. For example, the processor 130 may perform the CC charging of the first battery cell 111-1 by transmitting the switching signal (e.g., an ON signal) for controlling the switching element 111-3 included in the first battery pack 111 to the first battery management module 111-2.

According to an example, the charging of the first battery pack 111 and the second battery pack 112 may be performed according to the CC-CV charging method. The CC-CV charging is a method mainly used for charging lithium ion batteries, and may be a method in which CC charging is performed first and then CV charging is performed when the CC charging is completed. Here, the CC charging may be a method of performing charging while constantly maintaining a current at a predetermined ampere, and the CV charging may be a method of performing charging while constantly maintaining a voltage at a predetermined volt.

Specifically, the current flowing through the first battery cell 111-1 and the second battery cell 112-1 is maintained constantly while CC charging is performed, so, the voltage inside the first battery cell 111-1 and the second battery cell 112-1 continuously increases. Therefore, when a predetermined time has passed since the CC charging is initiated or the voltage inside the first battery cell 111-1 and the second battery cell 112-1 reaches a critical value, the CV charging is performed by reducing the amount of current while maintaining a voltage at a predetermined level to prevent overvoltage.

According to an example, when receiving status information indicating that the CC charging of the first battery cell 111-1 is completed from the first battery management module 111-2, the processor 130 may initiate the CV charging of the second battery cell 112-1. For example, the processor 130 may perform the CV charging of the second battery cell 112-1 by transmitting the switching signal (e.g., an ON signal) for controlling the switching element 112-3 included in the second battery pack 112 to the second battery management module 111-2.

According to an example, when receiving status information indicating that the CV charging of the second battery cell 112-1 is completed from the second battery management module 112-2, the processor 130 may initiate the CV charging of the first battery cell 111-1. For example, the processor 130 may perform the CV charging of the first battery cell 111-1 by transmitting the switching signal (e.g., an ON signal) for controlling the switching element 111-1 included in the first battery pack 111 to the first battery management module 111-2.

According to one or more embodiments, when the input power is not identified, the processor 130 may sequentially perform discharge on the second battery pack 112 and the first battery pack 111. According to an example, the first battery pack 111 and the second battery pack 112 may be discharged according to a CC discharging method. For example, when discharging the first battery pack 111 and the second battery pack 112, the CC discharge is performed to constantly maintain a current, thereby generating a constant output while preventing overcurrent.

Figure 3:
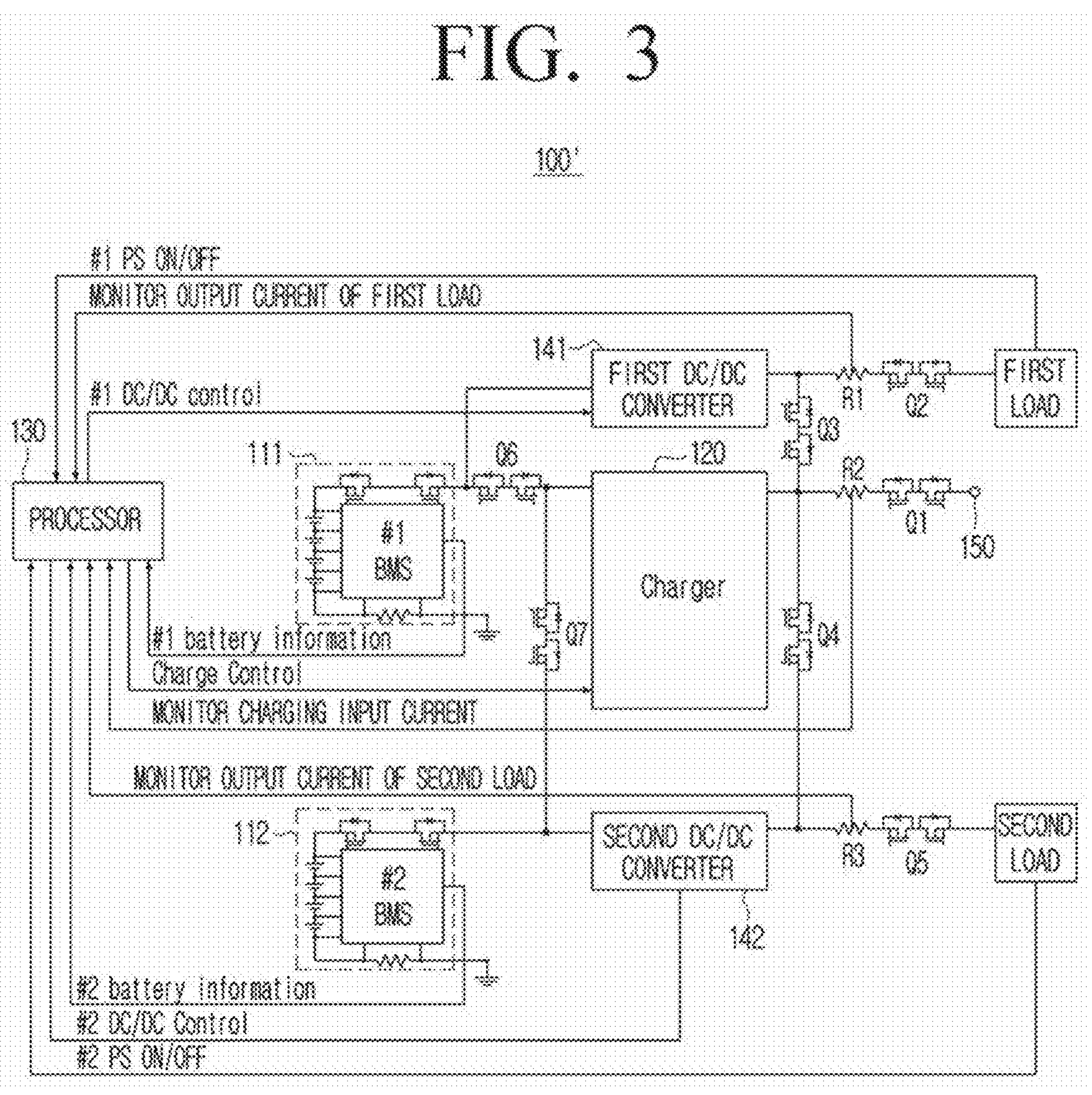
FIG. 3 is a diagram for describing the configuration of the battery system according to one or more embodiments.

FIG. 3 is a diagram for describing the configuration of the battery system according to one or more embodiments.

According to FIG. 3, a battery system 100' according to one or more embodiments may include the first battery pack 111, the second battery pack 112, the charger 120, the processor 130, a first DC/DC converter 141, a second DC/DC converter 142, a power supply unit (supplier) 150, and switching elements Q1, Q2, Q3, Q4, Q5, Q6, and Q7 connecting each block.

The first DC/DC converter 141 is connected to the first battery pack 111 and may be a converter for a first load. For example, the first load may be a relatively heavy load greater than a critical size. For example, the critical size may be a value preset during manufacturing. However, the critical size may be changed depending on the usage form of the battery system 100'.

The second DC/DC converter 142 is connected to the first battery pack 111 and may be a converter for a second load. For example, the second load may be a light load less than a critical size.

The first DC/DC converter 141 and the second DC/DC converter 142 are devices that convert a certain DC voltage into another DC voltage, and may perform an operation of maintaining an output voltage of the first battery pack 111 and the second battery pack 112 at a constant voltage regardless of the discharge state of the battery cells. For example, the first DC/DC converter 141 and the second DC/DC converter 142 may convert relatively high-voltage DC power output from the battery into low-voltage DC power suitable for the load.

The power supply unit 150 may be configured to supply power to the charger 120. For example, the power supply unit 150 may be implemented to support universal serial bus power delivery (USB PD) that supplies power to a device having a USB port through a USB cable, but is not limited thereto.

According to one or more embodiments, the processor 130 may receive battery information from the first battery management module 111-2 and the second battery management module 112-2. For example, the first battery pack 111 may be implemented to have the relatively high discharging performance and the second battery pack 112 may be implemented to have the relatively high charging performance. In this case, the processor 130 may know characteristics of each battery pack 111 and 112. The processor 130 may monitor capacities of the first battery pack 111 and the second battery pack 112 and monitor system-on-chip (SoC) information of the first battery pack 111 and the second battery pack 112 based on the battery information received from the first battery management module 111-2 and the second battery management module 112-2.

According to one or more embodiments, the processor 130 may monitor input and output information of the charger 120 and the first DC/DC converter 141 and the second DC/DC converter 142 and control the input and output.

According to one or more embodiments, the processor 130 may receive a power supply (PS) ON/OFF signal from the load to check the required power information of the load.

According to one or more embodiments, when the input power is identified, the processor 130 may control the charger 120 to sequentially perform the CC charging of the second battery pack 112 and the first battery pack 111. According to an example, the second battery pack 112 may be implemented to have higher charging performance than the first battery pack 111, and the first battery pack 111 may be implemented to have higher discharging performance than the second battery pack 112.

According to one or more embodiments, when the CC charging of the second battery pack 112 and the first battery pack 111 is completed, the processor 130 may control the charger 120 to sequentially perform constant voltage (CV) charging of the second battery pack 112 and the first battery pack 111. According to one or more embodiments, when the CC charging of the second battery pack 112 and the first battery pack 111 is completed, the processor 130 may control the charger 120 to sequentially perform the CV charging of the first battery pack 111 and the second battery pack 112.

According to one or more embodiments, when the input power is not identified, the processor 130 may sequentially discharge the first battery pack 111 and the second battery pack 112 by turning on the first DC/DC converter 141 and the second DC/DC converter 142. For example, the processor 130 may discharge the second battery pack 112, and when the second battery pack 112 is fully discharged, the processor 130 may discharge the first battery pack 111, but is not limited thereto. For example, the processor 130 may discharge the first battery pack 111, and when the first battery pack 111 is fully discharged, the processor 130 may discharge the second battery pack 112.

According to one or more embodiments, the first switching element Q1 may be provided between the power supply unit 150 and the charger 120. For example, the switching element may be a component having a circuit opening/closing operation without using a contact. For example, the switching element may be implemented as a diode, a transistor, a metal oxide semiconductor field effect transistor (MOSFET), an insulated gate bipolar mode transistor (IGBT), etc.

According to one or more embodiments, a first resistance R1 may be provided at one terminal of the first DC/DC converter 141. The resistance may be an element that acts to prevent a conductor from flowing current.

According to one or more embodiments, a second switching element Q2 may be provided at the other terminal opposite to one terminal of the first resistance R1 connected to the first DC/DC converter 141. According to an example, the first load may be connected to the other terminal of the second switching element Q2. For example, the first load may be a relatively heavy load greater than a critical size.

According to one or more embodiments, the third switching element Q3 may be provided between one terminal of the first DC/DC converter 141 and the charger 120. For example, the third switching element Q3 may be connected to one terminal of the first DC/DC converter 141 and the first resistance R1.

According to one or more embodiments, the fourth switching element Q4 may be provided between one terminal of the second DC/DC converter 142 and the charger 120. For example, the fourth switching element Q4 may be connected to one terminal of the second DC/DC converter 142 and a third resistance R3.

According to one or more embodiments, the third resistance R3 may be provided to one terminal of the second DC/DC converter 142.

According to one or more embodiments, a second resistance R2 may be provided to one terminal of the first switching element Q1 between the third switching element Q3 and the fourth switching element.

According to one or more embodiments, the fifth switching element Q5 may be provided at the other terminal opposite to one terminal of the third resistance R3 connected to the second DC/DC converter 142. According to an example, the second load may be connected to the other terminal of the fifth switching element Q5. For example, the second load may be a light load less than a critical size.

According to one or more embodiments, the sixth switching element Q6 may be provided between the other terminal of the first DC/DC converter 141 and the charger 120. According to an example, the first battery pack 111 may be provided between the other terminal of the first DC/DC converter 141 and the sixth switching element Q6.

According to one or more embodiments, the seventh switching element Q7 may be provided between the other terminal of the second DC/DC converter 142 and the charger 120. According to an example, the second battery pack 112 may be provided between the other terminal of the second DC/DC converter 142 and the seventh switching element Q7.

According to one or more embodiments, when the input power is identified in the power supply unit 150, the processor 130 may control the charger 120 to sequentially perform the CC charging of the first battery pack 111 and the second battery pack 112. According to an example, the first battery pack 111 may be implemented to have higher discharging performance than the second battery pack 112, and the second battery pack 112 may be implemented to have higher charging performance than the first battery pack 111.

According to one or more embodiments, when the CC charging of the first battery pack 111 and the second battery pack 112 is completed, the processor 130 may control the charger 120 to sequentially perform the CV charging of the first battery pack 111 and the second battery pack 112.

According to one or more embodiments, the processor 130 may monitor the output current of the first load connected to the other terminal of the second switching element Q2 through the first resistance R1 connected to one terminal of the second switching element Q2.

According to one or more embodiments, the processor 130 may monitor the output current of the second load connected to the other terminal of the fifth switching element Q5 through the third resistance R3 connected to one terminal of the fifth switching element Q5.

According to one or more embodiments, the processor 130 may control the first battery pack 111 and the second battery pack 112 to be discharged based on the output current of the first load and the output current of the second load.

The battery system 100' may further include, in addition to the components illustrated in FIG. 3, a housing for protecting the battery pack 110 and the charger 120, an insulation for preventing short-circuits, a circuit for connecting components inside the battery system 100', a cooler for preventing overheating of the battery system 100', and the like.

Figure 4:
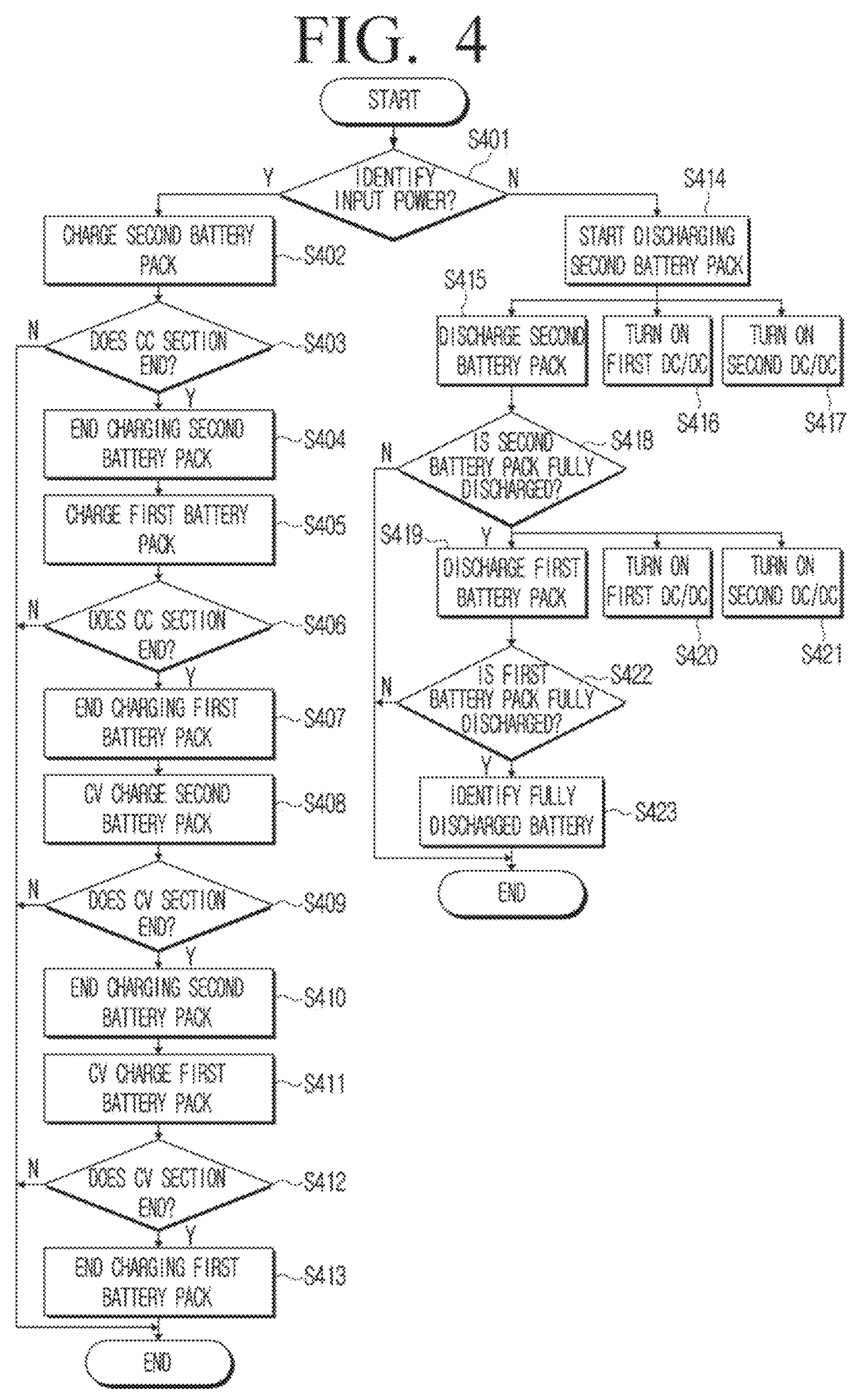
FIG. 4 is a flowchart for describing a charging/discharging operation of the battery system according to one or more embodiments.

FIG. 4 is a flowchart for describing a charging/discharging operation of the battery system according to one or more embodiments.

According to the flowchart illustrated in FIG. 4, in operation S401, the battery systems 100 and 100' may identify whether there is the input power. According to one or more embodiments, the processor 140 may identify whether there is the input power based on an interrupt. For example, the interrupt indicates that when processor 130 is executing a program, the processor 130 may be notified of the need to process exceptions occurring in devices such as input/output hardware and process the exceptions. For example, the battery systems 100 and 100' may identify whether there is the input power based on the interrupt connected to an external power supply device through the power supply unit 150.

In operation S401, the battery systems 100 and 100' may initiate the CC charging of the second battery pack 112 in operation S402 when there is the input power (S401: Y). For example, the second battery pack 112 may be a battery pack having relatively high charging performance (or charging characteristics). For example, when the first battery pack 111 is implemented to have relatively high discharging performance and the second battery pack 112 is implemented to have relatively high charging performance, the CC charging of the second battery pack 112 with relatively high charging performance may be performed first.

In operation S403, the battery systems 100 and 100' may identify whether a CC section for the second battery pack 112 is terminated. For example, when receiving status information indicating that the CC charging of the second battery cell 112-1 is completed from the second battery management module 112-2, the processor 130 may identify that the CC section is terminated.

When it is identified that the CC section for the first battery pack 111 is terminated in operation S403 (S403: Y), the battery systems 100 and 100' may terminate the CC charging of the first battery pack 111 in operation 404.

In operation S404, when the CC charging of the second battery pack 112 is terminated, in operation S405, the battery systems 100 and 100' may initiate the CC charging of the first battery pack 111 having relatively high discharging performance.

In operation S406, the battery systems 100 and 100' may identify whether the CC section for the first battery pack 111 is terminated. For example, when receiving status information indicating that the CC charging of the first battery cell 111-1 is completed from the first battery management module 111-2, the processor 130 may identify that the CC section is terminated.

When it is identified that the CC section for the first battery pack 111 is terminated in operation S406 (S406: Y), in operation S407, the battery systems 100 and 100' may terminate the CC charging of the first battery pack 111.

In operation S407, when the CC charging of the first battery pack 111 is terminated, in operation S408, the battery systems 100 and 100' may initiate the CV charging of the second battery pack 112.

In operation S409, the battery systems 100 and 100' may identify whether the CC section for the second battery pack 112 is terminated. For example, when receiving status information indicating that the CV charging of the second battery cell 112-1 is completed from the second battery management module 112-2, the processor 130 may identify that the CV section is terminated.

When it is identified that the CV section for the second battery pack 112 is terminated in operation S409 (S409: Y), in operation 410, the battery systems 100 and 100' may terminate the CV charging of the second battery pack 112.

In operation S410, when the CV charging of the second battery pack 112 is terminated, in operation S411, the battery systems 100 and 100' may initiate the CV charging of the first battery pack 111.

In operation S412, the battery systems 100 and 100' may identify whether the CV section for the first battery pack 111 is terminated. For example, when receiving status information indicating that the CV charging of the first battery cell 111-1 is completed from the first battery management module 111-2, the processor 130 may identify that the CV section is terminated.

When it is identified that the CV section for the first battery pack 111 is terminated in operation S412 (S412: Y), in operation S413, the battery systems 100 and 100' may terminate the CV charging of the first battery pack 111.

When there is no input power in operation S401 (S401: N), the battery systems 100 and 100' may initiate the discharging of the first battery pack 111 in operation 415.

The battery system 100 and 100' may discharge the second battery pack 112 by turning on the first DC/DC converter 141 in operation S416 and turning on the second DC/DC converter 142 in operation S417.

In operation S418, the battery systems 100 and 100' may identify whether the discharging of the second battery pack 112 is terminated. For example, when receiving status information indicating that the first battery cell 111-1 is fully discharged from the first battery management module 111-2, the processor 130 may identify that the discharging is terminated.

When it is identified that the discharging of the second battery pack 112 is terminated (S418: Y), in operation S419, the battery system 100 and 100' may initiate the discharging of the first battery pack 111.

The battery systems 100 and 100' may discharge the first battery pack 111 by turning on the first DC/DC converter 141 in operation S420 and turning on the second DC/DC converter 142 in operation S421.

In operation S422, the battery systems 100 and 100' may identify whether the discharging of the first battery pack 111 is terminated. For example, when receiving status information indicating that the first battery cell 111-1 is fully discharged from the first battery management module 111-2, the processor 130 may identify that the discharging is terminated.

When it is identified that the discharging of the first battery pack 111 is terminated (S422: Y), in operation S423, the battery system 100 and 100' may identify that the battery is fully discharged.

In FIG. 4, the order of all steps is mapped for convenience of description, but the order of steps that are unrelated to the order or may be performed in parallel is not necessarily limited to that order. According to an example, the CV charging operation of the first battery pack 111 described in operations S411 to S413 may be performed before the CV charging operation of the second battery pack 112 described in operations S408 to S410. According to an example, the discharging operation of the first battery pack 111 described in operations S419 to S422 may be performed before the discharging operation of the second battery pack 112 described in operations S414 to S418.

Hereinafter, operations according to each embodiment will be described with reference to FIGS. 5 to 10 based on FIG. 4.

According to an example, the battery system 110 and 100' may perform the CC charging of the first battery pack 111 having relatively high discharging performance after performing the CC charging of the second battery pack 112 having relatively high charging performance as described in FIGS. 3 and 4. However, in the following, for the convenience of description, it will be described that the CC charging of the first battery pack 111 is performed first.

Figure 5:
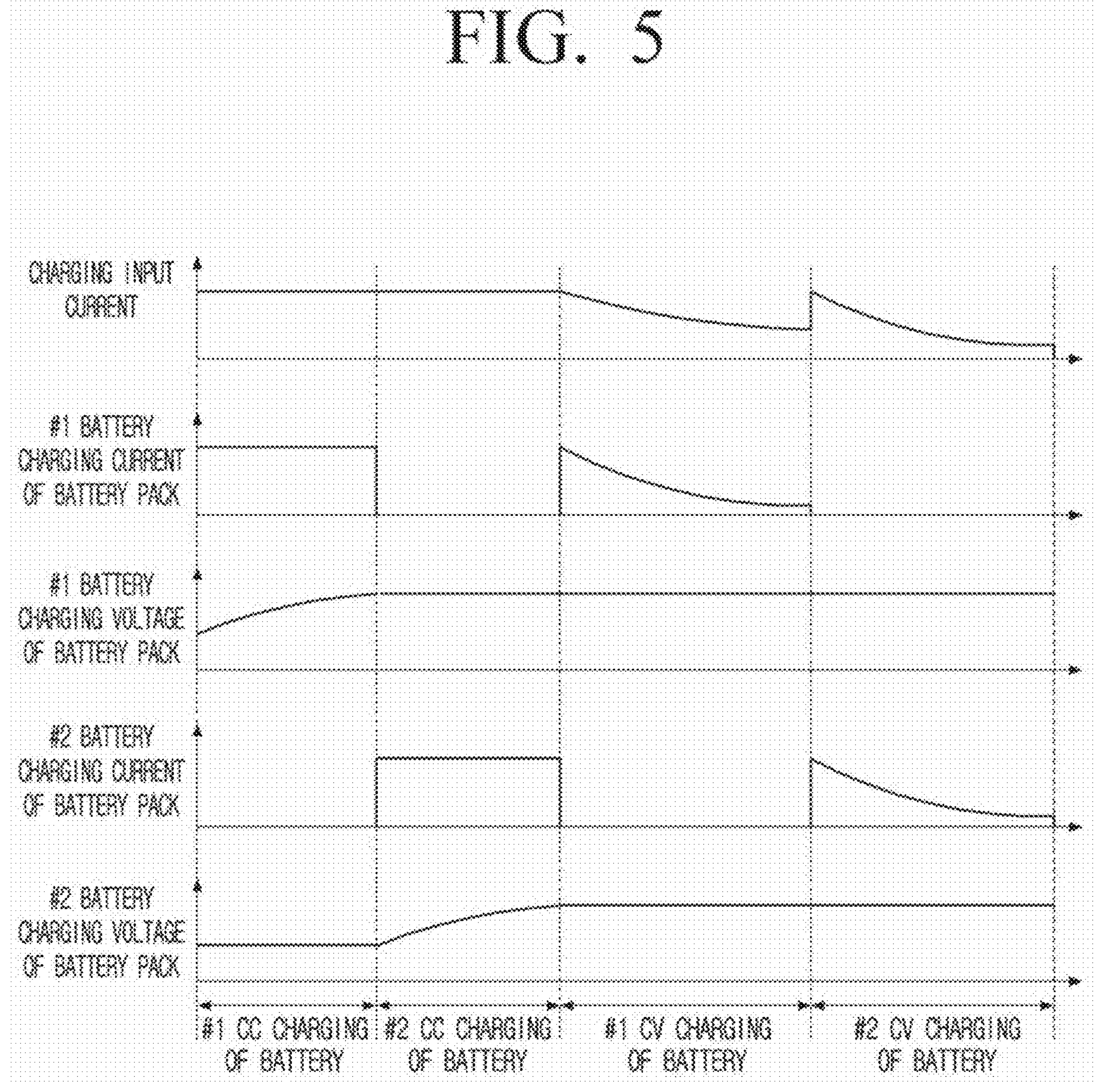
FIGS. 5 and 6 are diagrams for describing the charging operation when input power is identified according to one or more embodiments.
Figure 6:
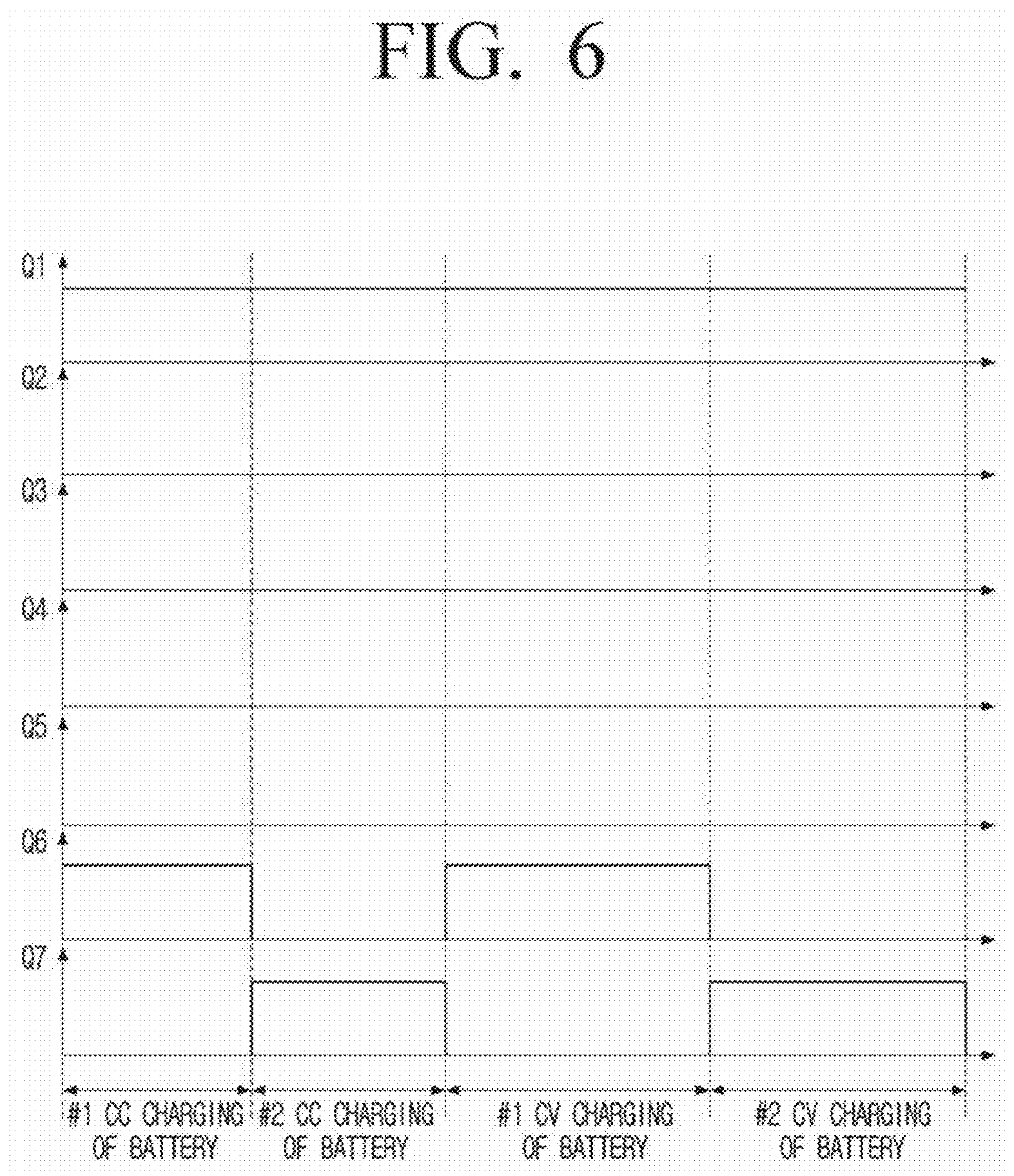

FIGS. 5 and 6 are diagrams for describing the charging operation when input power is identified according to one or more embodiments.

As illustrated in FIG. 5, when the input power is identified through the power supply unit 150, the processor 130 may sequentially perform the CC charging of the first battery pack 111 and the second battery pack 112, and then sequentially perform the CV charging of the first battery pack 111 and the second battery pack 112.

According to an example, as illustrated in FIG. 6, the processor 130 may turn on the first switching element Q1 and turn off the second switching element Q2, the third switching element Q3, the fourth switching element Q4, and the fifth switching element Q5. This is to perform only the charging operation of the first battery pack 111 and the second battery pack 112 through the input power, so the second switching element Q2, the third switching element Q3, the fourth switching element Q4, and the fifth switching element Q5 related to the discharging of the battery may be turned off.

As an example, as illustrated in FIG. 6, the processor 130 may control the charger 120 to perform the CC charging of the first battery pack by turning on the sixth switching element Q6 and turning off the seventh switching element Q7 (#1 battery CC charging section). In this case, as illustrated in FIG. 5, in the "#1 battery CC charging section," the charging current of the first battery pack 111 is maintained constant according to the CC charging of the first battery pack 111, and the charging voltage of the first battery pack 111 gradually increases (or rises).

As an example, as illustrated in FIG. 6, when the CC charging of the first battery pack 111 is completed, the processor 130 may control the charger 120 to perform the CC charging of the second battery pack 112 by turning off the sixth switching element Q6 and turning on the seventh switching element Q7 (#2 battery CC charging section). In this case, as illustrated in FIG. 5, in the "#2 battery CC charging section," the charging current of the second battery pack 112 is maintained constant according to the CC charging of the second battery pack 112, and the charging voltage of the second battery pack 112 gradually increases.

As an example, as illustrated in FIG. 6, when the CC charging of the second battery pack 112 is completed, the processor 130 may perform the CV charging of the first battery pack 111 by turning on the sixth switching element Q6 and turning off the seventh switching element Q7 (#1 battery CC charging section). In this case, as illustrated in FIG. 5, in the "#1 battery CC charging section," the charging current of the first battery pack 111 decreases according to the CV charging of the first battery pack 111, and the charging voltage of the first battery pack 111 is maintained.

As an example, as illustrated in FIG. 6, when the CV charging of the first battery pack 111 is completed, the processor 130 may control the charger 120 to perform the CV charging of the second battery pack 112 by turning off the sixth switching element Q6 and turning on the seventh switching element Q7 (#2 battery CV charging section). In this case, as illustrated in FIG. 5, in the "#2 battery CV charging section," the charging current of the second battery pack 112 decreases according to the CV charging of the second battery pack 112, and the charging voltage of the second battery pack 112 is maintained.

Figure 7:
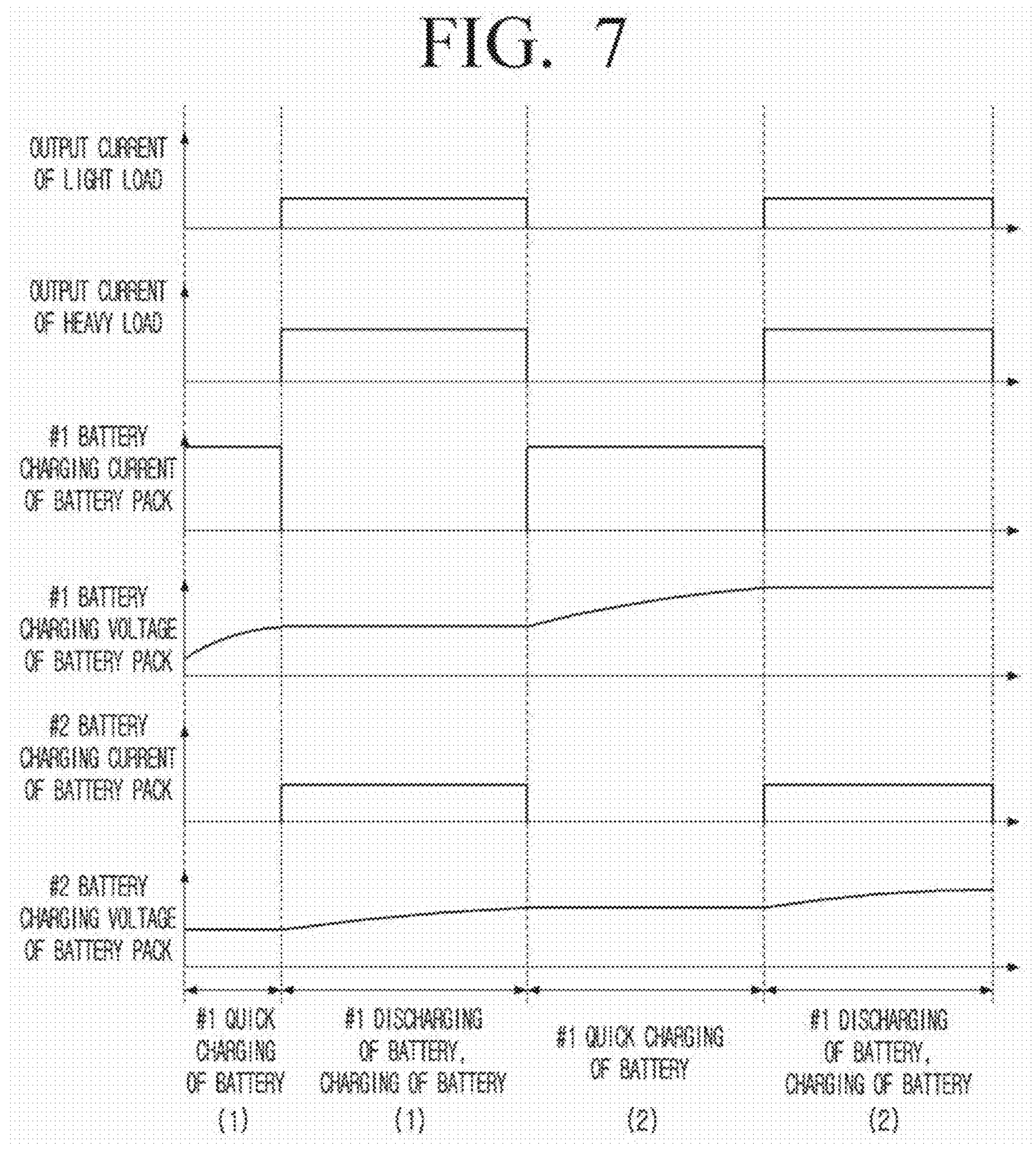
FIGS. 7 and 8 are diagrams for describing an operation when a section where the input power is identified and a section where the input power is not identified are repeated according to one or more embodiments.
Figure 8:
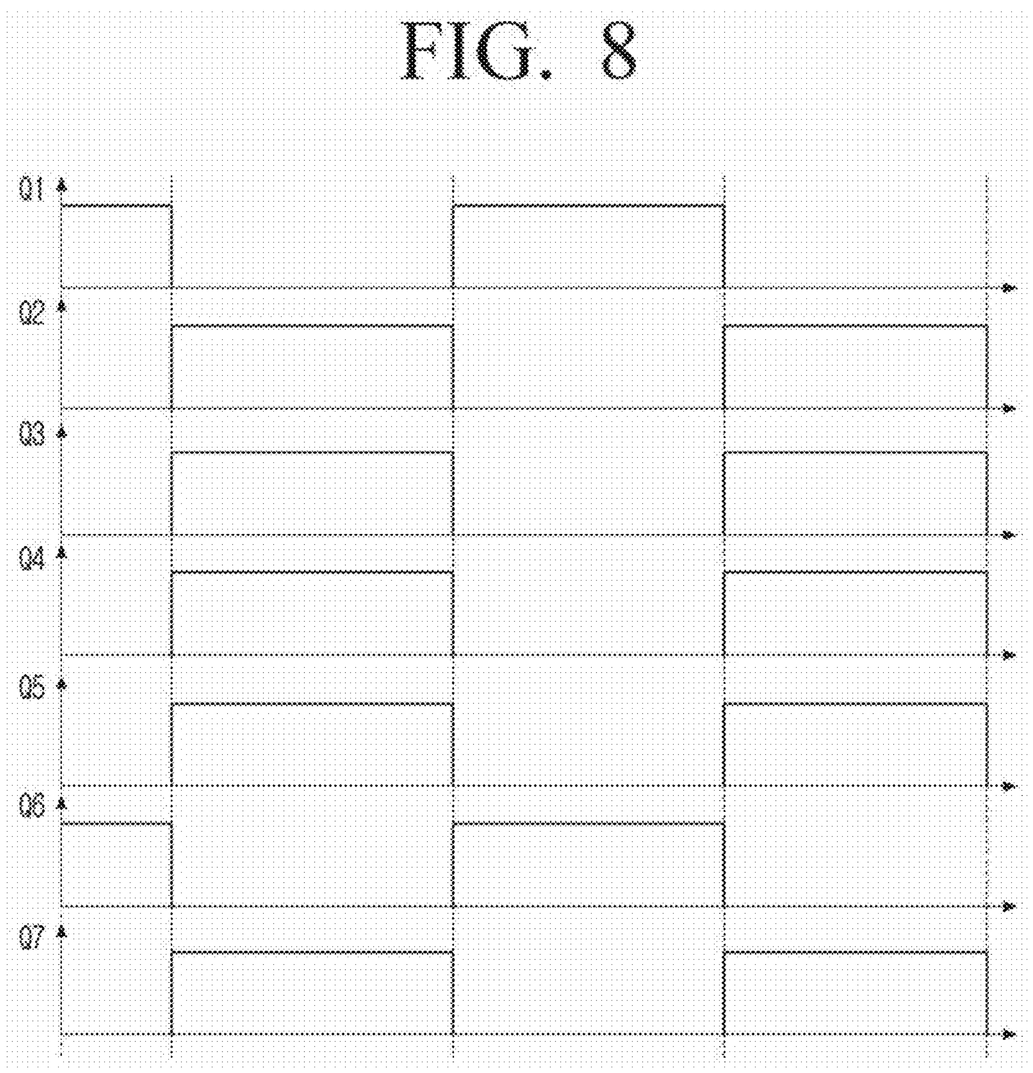

FIGS. 7 and 8 are diagrams for describing an operation when a section where the input power is identified and a section where the input power is not identified are repeated according to one or more embodiments.

As illustrated in FIG. 7, the processor 130 may perform the CC charging of the first battery pack 111 in a section where the input power is identified through the power supply unit 150 (#1 battery rapid charging section 1). According to an example, as illustrated in FIG. 8, the processor 130 may perform the CC charging of the first battery pack 111 by turning on the first switching element Q1 and the sixth switching element Q6 and turning off the second switching element Q2, the third switching element Q3, the fourth switching element Q4, the fifth switching element Q5, and the seventh switching element Q7 in the "#1 battery rapid charging section 1." In this case, as illustrated in FIG. 7, in the "#1 battery rapid charging section 1," the charging current of the first battery pack 111 is maintained constant and the charging voltage of the first battery pack 111 gradually increases according to the CC charging of the first battery pack 111.

As illustrated in FIG. 7, the processor 130 may perform the discharging of the first battery pack 111 and the CC charging of the second battery pack 112 in a section where the input power is not identified through the power supply unit 150 (#1 battery discharging and #2 battery charging section 1). According to an example, as illustrated in FIG. 8, the processor 130 may perform the CC charging of the second battery pack 112 and the discharging of the first battery pack 111 by turning off the first switching element Q1 and the sixth switching element Q6 and turning on the second switching element Q2, the third switching element Q3, the fourth switching element Q4, the fifth switching element Q5, and the seventh switching element Q7 in the "#1 battery discharging and #2 battery charging section 1." In this case, as illustrated in FIG. 7, in the "#1 battery discharge and #2 battery charge section 1," the charging current of the second battery pack 112 is maintained constant according to the CC charging of the second battery pack 112, and the charging voltage of the second battery pack 112 gradually increases. In addition, as illustrated in FIG. 7, in the "#1 battery discharge and #2 battery charge section 1," an output current of the light load and an output current of the heavy load are each maintained at a constant value according to the discharging of the first battery pack 111.

As illustrated in FIG. 7, the processor 130 may perform the CC charging of the first battery pack 111 in a section where the input power is identified again through the power supply unit 150 (#1 battery rapid charging section 2). According to an example, as illustrated in FIG. 8, the processor 130 may perform the CC charging of the first battery pack 111 by turning on the first switching element Q1 and the sixth switching element Q6 and turning off the second switching element Q2, the third switching element Q3, the fourth switching element Q4, the fifth switching element Q5, and the seventh switching element Q7 in the "#1 battery rapid charging section 1." In this case, as illustrated in FIG. 7, in the "#1 battery rapid charging section 2," the charging current of the first battery pack 111 is maintained constant and the charging voltage of the first battery pack 111 gradually increases according to the CC charging of the first battery pack 111.

As illustrated in FIG. 7, the processor 130 may perform the discharging of the first battery pack 111 and the CC charging of the second battery pack 112 in a section where the input power is not identified again through the power supply unit 150 (#1 battery discharging and #2 battery charging section 2). According to an example, as illustrated in FIG. 8, the processor 130 may perform the CC charging of the second battery pack 112 and the discharging of the first battery pack 111 by turning off the first switching element Q1 and the sixth switching element Q6 and turning on the second switching element Q2, the third switching element Q3, the fourth switching element Q4, the fifth switching element Q5, and the seventh switching element Q7 in the "#1 battery discharging and #2 battery charging section 2." In this case, as illustrated in FIG. 7, in the "#1 battery discharge and #2 battery charge section 2," the charging current of the second battery pack 112 is maintained constant according to the CC charging of the second battery pack 112, and the charging voltage of the second battery pack 112 gradually increases. In addition, as illustrated in FIG. 7, in the "#1 battery discharge and #2 battery charge section 2," the output current of the light load and the output current of the heavy load are each maintained at a constant value according to the discharging of the first battery pack 111.

Figure 9:
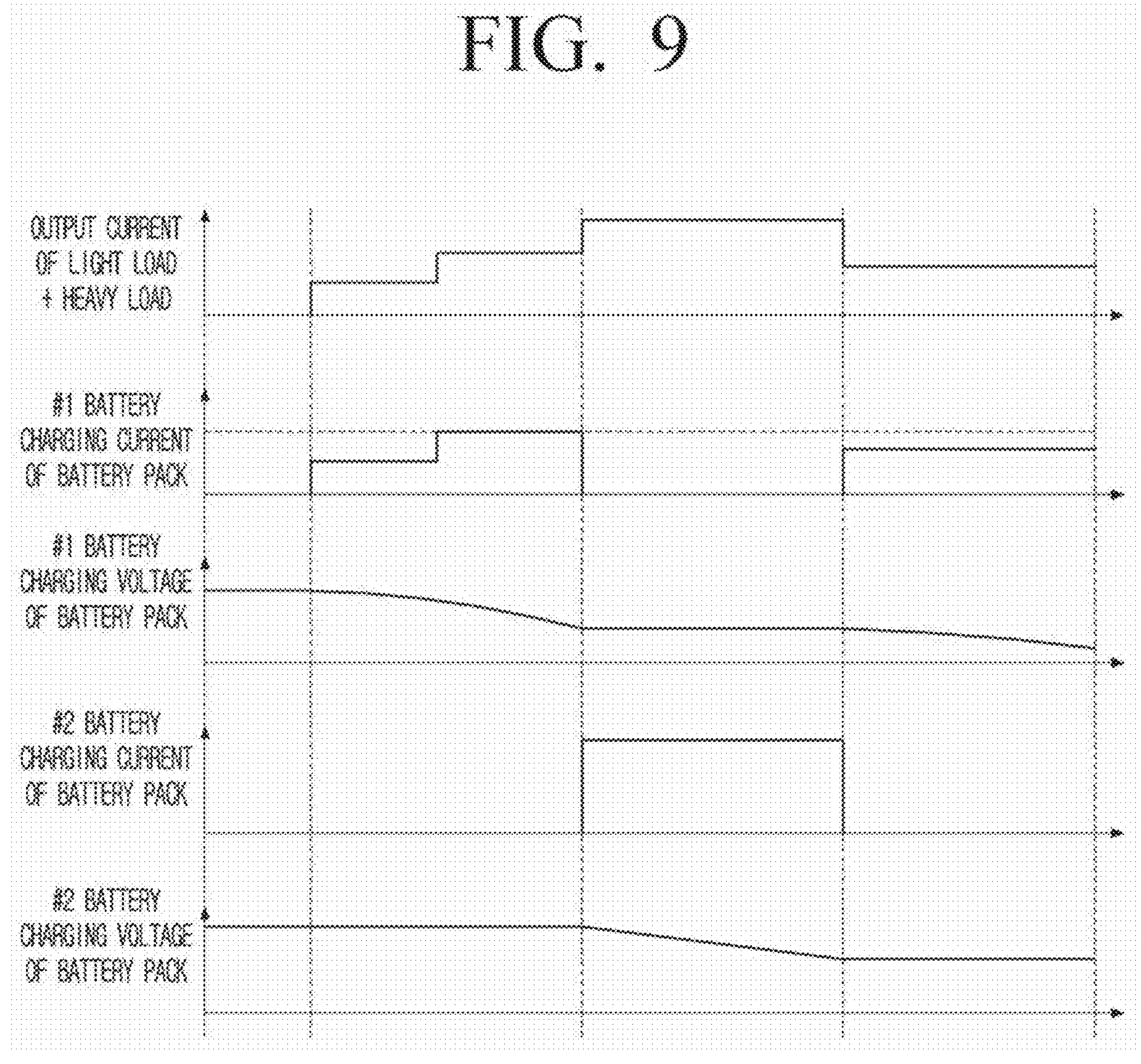
FIGS. 9 and 10 are diagrams for describing the discharging operation according to discharging power according to one or more embodiments.
Figure 10:
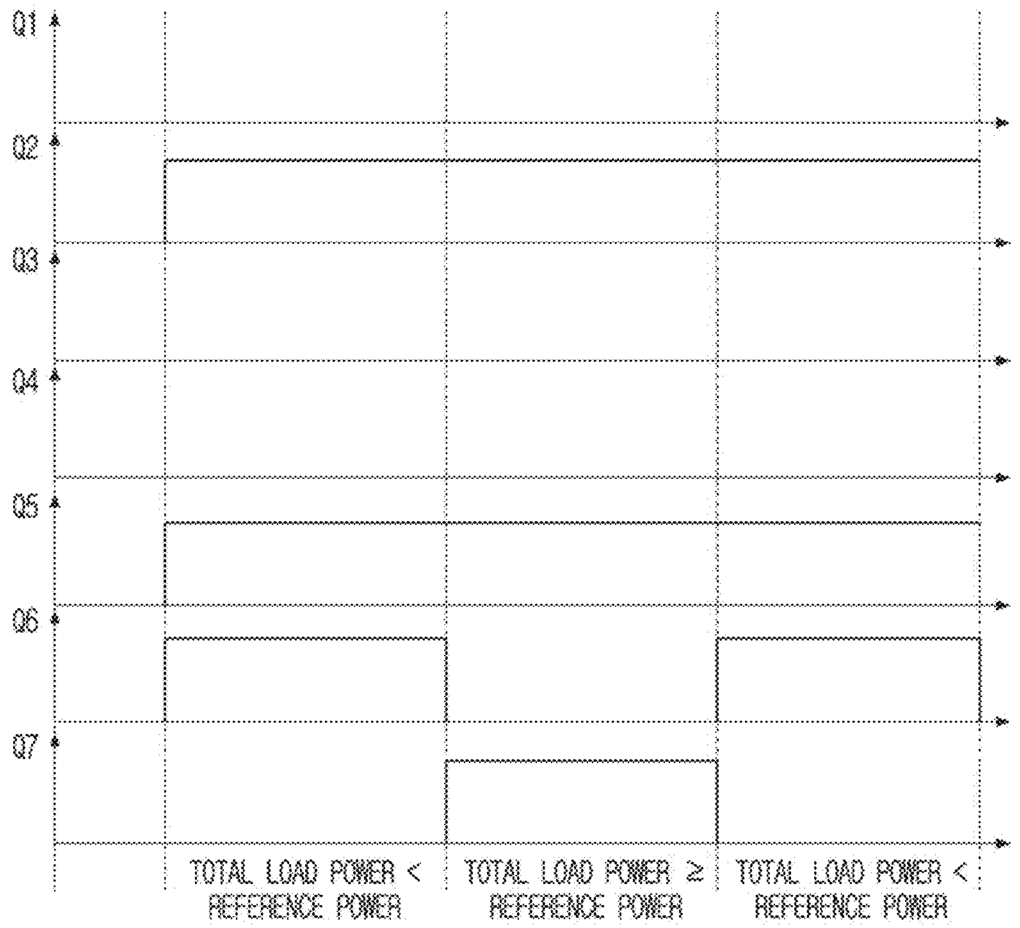

FIGS. 9 and 10 are diagrams for describing the discharging operation according to discharging power according to one or more embodiments.

According to one or more embodiments, when the output current of the load is identified, the processor 130 may discharge at least one of the first battery pack 111 and the second battery pack 112 based on whether the output current of the load is higher than or equal to a reference current.

According to one or more embodiments, as illustrated in FIG. 9, when the output current of the load (light load+heavy load) is identified as greater than or equal to a critical value, the processor 130 may maintain a turn off state of the first switching element Q1, the third switching element Q3, and the fourth switching element Q4, and may turn on the second switching element Q2 and the fifth switching element Q5. This is to perform only the discharging operation of the first battery pack 111 and the second battery pack 112, and accordingly, the turn off state of the first switching element Q1, the third switching element Q3, and the fourth switching element Q4 related to the battery charging may be maintained.

For example, the processor 130 may discharge the first battery pack 111 by turning on the sixth switching element Q6 and turning off the seventh switching element Q7 in a section where the output current of the load is less than the reference power. In this case, as illustrated in FIG. 9, as the output current of the load gradually (for example, stepwise) increases, the discharging current of the first battery pack 111 may also gradually increase, and the voltage of the first battery pack 111 may smoothly decrease.

According to an example, the processor 130 may discharge the second battery pack 112 by turning off the sixth switching element Q6 and turning on the seventh switching element Q7 in a section where the output current of the load is higher than the reference power. For example, the reference power may be a value preset during manufacturing. In this case, as illustrated in FIG. 9, as the output current of the load is constantly maintained to be higher than or equal to the reference power, the discharging current of the second battery pack 112 is constantly maintained, and the voltage of the second battery pack 112 may be linearly reduced.

For example, the processor 130 may discharge the first battery pack 111 by turning on the sixth switching element Q6 and turning off the seventh switching element Q7 in a section where the output current of the load is less than the reference power. In this case, as illustrated in FIG. 9, as the output current of the load is constantly maintained to be less than the reference power, the discharging current of the first battery pack 111 is constantly maintained, and the voltage of the second battery pack 112 may be linearly reduced.

However, embodiments are not limited to the embodiments illustrated in FIGS. 9 and 10, and when the output current of the load is less than the reference power, the second battery pack 112 may be discharged first, and when the output current of the load is relatively higher than or equal to the reference power, the first battery pack 111 may be discharged.

In the above-described embodiment, it has been described that the processor 130 directly performs all control operations, but according to another example, each of the first battery pack 111 and the second battery pack 112 may include a battery processor, so it may be possible to control the charging and/or discharging of the first battery pack 111 and the second battery pack 112 through the battery processor. For example, the battery processor may perform the charging and discharging according to the embodiments by transmitting the switching signal for controlling the switching element connected to the battery cell to the battery management module. For example, the battery processor may acquire the status information of the battery cell through the battery management module and transmit the status information of the battery cell to the processor 130. The battery processor may be implemented as a microcontroller unit (MCU) or a microcontroller, but is not limited thereto.

According to one or more embodiments, the battery systems 100 and 100' may receive the status information of the battery cells 111-1 and 112-1 included in the battery pack 120 from the battery management modules 111-2 and 112-2 and provide the status information to the user. For example, the battery systems 100 and 100' may include a communication interface including at least one of a WiFi module, a Bluetooth module, a wireless communication module, an NFC module, and a ultra wide band (UWB) module, and the processor 130 may control the communication interface to transmit the status information of the battery cells 111-1 and 112-1 to an external device. In this case, the status information of the battery cells 111-1 and 112-1 may be provided to the user through the external device.

In addition, the battery systems 100 and 100' may include an output interface including a display and a speaker. In this case, the processor 130 may control the display to display an image for the status information of the battery cells 111-1 and 112-1, or control the speaker to output a sound corresponding to the status information of the battery cells 111-1 and 112-1.

In one or more embodiments, the processor 130 may receive information on the remaining capacity of the battery cells 111-1 and 112-1 included in the battery pack 120 from the battery management modules 111-2 and 112-2 included in the battery pack 120. The processor 130 may acquire information on the total remaining capacity representing the remaining capacity of the entire battery cells 111-1 and 112-1 by adding up the information on the remaining capacity of the battery cells 111-1 and 112-1. When the information on the total remaining capacity is received, the processor 130 may control a communication interface to transmit the information on the total remaining capacity to the external device, and also control the output interface to provide the information on the total remaining capacity.

In one or more embodiments, the processor 130 may receive information on whether the battery cells 111-1 and 112-1 included in the battery pack 120 fail from the battery management modules 111-2 and 112-2 included in the battery pack 120. When the information on the failure of the battery cells 111-1 and 112-1 included in the battery pack 120 is received, the processor 130 may control the communication interface to transmit the information on the failure status to the external device, and also control the output interface to provide the information on the failure status.

According to various embodiments described above, the system may be appropriately configured by simultaneously applying different loads and different batteries and utilizing the charging/discharging characteristics of each battery. Accordingly, both the quick charging and relatively high-power discharging are possible, which may greatly improve user usability. In addition, since the advantages of the battery with different characteristics may be utilized, the battery usability and lifespan may be improved.

The methods according to the embodiments of the disclosure described above may be implemented only by software upgrade or hardware upgrade for the existing electronic device and/or server.

In addition, various embodiments of the embodiments described above may be performed through an embedded server provided in the electronic device or a server outside the electronic device.

According to one or more embodiments of the disclosure, the embodiments described above may be implemented as software including instructions stored in a machine-readable storage medium (e.g., a computer-readable storage medium). A machine may be a device that invokes the stored instruction from the storage medium and may be operated according to the invoked instruction, and may include the electronic device (e.g., the electronic device A) according to the embodiments. When a command is executed by the processor, the processor may directly perform an operation corresponding to the command or other components may perform the operation corresponding to the command under a control of the processor. The command may include codes created or executed by a compiler or an interpreter. The machine-readable storage medium may be provided in a form of a non-transitory storage medium. Here, the term non-transitory indicates that the storage medium is tangible without including a signal, and does not distinguish whether data are semi-permanently or temporarily stored in the storage medium.

In addition, according to one or more embodiments of the disclosure, the methods according to the embodiments described above may be included and provided in a computer program product. The computer program product may be traded as a product between a seller and a purchaser. The computer program product may be distributed in the form of a storage medium (e.g., a compact disc read only memory (CD-ROM)) that may be read by the machine or online through an application store. In a case of the online distribution, at least portions of the computer program product may be at least temporarily stored in a storage medium such as a memory of a server of a manufacturer, a server of an application store, or a relay server or be temporarily created.

In addition, each of components (e.g., modules or programs) according to the embodiments described above may include a single entity or a plurality of entities, and some of the corresponding sub-components described above may be omitted or other sub-components may be further included in the diverse embodiments. Alternatively or additionally, some of the components (e.g., the modules or the programs) may be integrated into one entity, and may perform operations performed by the respective corresponding components before being integrated in the same or similar manner. Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

While embodiments have been described with reference to the figures, it will be understood by those of ordinary skill in the art that various changes in form and details may be made therein without departing from the spirit and scope as defined by the following claims and their equivalents.

What is claimed is:

1. A battery system, comprising:

a first battery pack comprising a first battery cell;

a second battery pack comprising a second battery cell;

a charger;

a first DC/DC converter, for a first load, connected to the first battery pack; and a second DC/DC converter, for a second load, connected to the second battery pack;

a power supplier;

a first switching element connected between the power supplier and the charger;

a first resistance connected to a first terminal of the first DC/DC converter;

a second switching element connected to the first resistance;

a third switching element connected between the first terminal of the first DC/DC converter and the charger;

a fourth switching element connected between a first terminal of the second DC/DC converter and the charger;

a second resistance connected to a first terminal of the first switching element between the third switching element and the fourth switching element;

a third resistance connected to the first terminal of the second DC/DC converter; and a fifth switching element connected to the third resistance; and at least one processor configured to:

control the charger to sequentially perform constant current (CC) charging on the second battery pack and the first battery pack based on input power being identified; and control the charger to sequentially perform constant voltage (CV) charging on the second battery pack and the first battery pack based on the CC charging of the second battery pack and the first battery pack being completed, wherein a discharging performance of the first battery pack is greater than a discharging performance of the second battery pack, and wherein a charging performance of the second battery pack is greater than a charging performance of the first battery pack.

2. The battery system of claim 1, wherein the at least one processor is further configured to turn on the first DC/DC converter and turn on the second DC/DC converter to sequentially discharge the second battery pack and the first battery pack based on the input power being not identified.

3. The battery system of claim 2, further comprising:

a sixth switching element connected between the first DC/DC converter and the charger; and a seventh switching element connected between the other terminal of the second DC/DC converter and the charger, wherein the first battery pack is connected between a second terminal of the first DC/DC converter and the sixth switching element, and wherein the second battery pack is connected between the second terminal of the second DC/DC converter and the seventh switching element.

4. The battery system of claim 3, wherein the at least one processor is further configured to:

monitor an output current of the first load connected to a second terminal of the second switching element through the first resistance connected to a first terminal of the second switching element;

monitor an output current of the second load connected to a second terminal of the fifth switching element through the third resistance connected to the first terminal of the fifth switching element; and control the first battery pack and the second battery pack to be discharged based on the output current of the first load and the output current of the second load.

5. The battery system of claim 4, wherein the first load is a load greater than or equal to a critical size, and wherein the second load is a load less than the critical size.

6. The battery system of claim 4, wherein the at least one processor is further configured to:

control the charger to perform the CC charging on the second battery pack by turning on the first switching element, turning off the second switching element, the third switching element, the fourth switching element, and the fifth switching element, and turning off the sixth switching element and turning on the seventh switching element based on the input power being identified;

control the charger to perform the CC charging on the first battery pack by turning on the sixth switching element and turning off the seventh switching element based on the CC charging of the second battery pack being completed;

control the charger to perform the CV charging on the second battery pack by turning off the sixth switching element and turning on the seventh switching element based on the CC charging of the first battery pack being completed; and control the charger to perform the CV charging on the first battery pack by turning on the sixth switching element and turning off the seventh switching element based on the CV charging of the second battery pack being completed.

7. The battery system of claim 4, wherein based on a section where the input power is identified and a section where the input power is not identified being repeated, the at least one processor is further configured to:

control the charger to perform the CC charging on the first battery pack by turning on the first switching element and the sixth switching element and turning off the second switching element, the third switching element, the fourth switching element, the fifth switching element, and the seventh switching element, in a section where the input power is identified; and control the charger to perform the CC charging on the second battery pack and discharge the first battery pack by turning on the second switching element, the third switching element, the fourth switching element, the fifth switching element, and the seventh switching element and turning off the first switching element and the sixth switching element, in a section where the input power is not identified.

8. The battery system of claim 4, wherein the at least one processor is further configured to:

turn off the first switching element, the third switching element, and the fourth switching element and turn on the second switching element and the fifth switching element, based on the output current of the first load and the output current of the second load being identified;

turn on the sixth switching element and turn off the seventh switching element to discharge the first battery pack, based on the output current being less than reference power; and turn off the sixth switching element and turn on the seventh switching element to discharge the second battery pack, based on the output current being higher than or equal to the reference power.

9. The battery system of claim 1, wherein the first battery pack comprises a first battery management device configured to obtain status information of the first battery cell, wherein the second battery pack comprises a second battery management device configured to obtain status information of the second battery cell, and wherein the at least one processor is further configured to:

monitor battery status information received from the first battery management device and the second battery management device; and control the CC charging and the CV charging of the first battery pack and the second battery pack based on the monitoring result.

10. A controlling method of a battery system comprising a first battery pack that comprises a first battery cell and a second battery pack that comprises a second battery cell, the controlling method comprising:

sequentially performing constant current (CC) charging on the second battery pack and the first battery pack based on input power being identified; and sequentially performing constant voltage (CV) charging on the second battery pack and the first battery pack based on the CC charging of the second battery pack and the first battery pack being completed, wherein a discharging performance of the first battery pack is greater than a discharging performance of the second battery pack, and wherein a charging performance of the second battery pack is greater than a charging performance of the first battery pack, wherein the battery system further comprises:

a first DC/DC converter, for a first load, connected to the first battery pack;

a second DC/DC converter, for a second load, connected to the second battery pack;

a power supplier;

a first switching element connected between the power supplier and the charger;

a first resistance connected to a first terminal of the first DC/DC converter;

a second switching element connected to the first resistance;

a third switching element connected between the first terminal of the first DC/DC converter and the charger;

a fourth switching element connected between a first terminal of the second DC/DC converter and the charger;

a second resistance connected to a first terminal of the first switching element between the third switching element and the fourth switching element;

a third resistance connected to the first terminal of the second DC/DC converter; and a fifth switching element connected to the third resistance.

11. The controlling method of claim 10, further comprising sequentially discharging the second battery pack and discharging the first battery pack by turning on the first DC/DC converter and the second DC/DC converter, based on input power being not identified.

12. The controlling method of claim 11, wherein the battery system further comprises:

a sixth switching element connected between the first DC/DC converter and the charger; and a seventh switching element connected between a second terminal of the second DC/DC converter and the charger, wherein the first battery pack is connected between a second terminal of the first DC/DC converter and the sixth switching element, and wherein the second battery pack is connected between the second terminal of the second DC/DC converter and the seventh switching element.

13. The controlling method of claim 12, further comprising:

monitoring an output current of a first load connected to a second terminal of the second switching element through the first resistance connected to a first terminal of the second switching element;

monitoring an output current of a second load connected to a second terminal of the fifth switching element through the third resistance connected to the first terminal of the fifth switching element; and controlling the first battery pack and the second battery pack to be discharged based on the output current of the first load and the output current of the second load.

14. A non-transitory computer-readable medium storing computer instructions that, when executed by a processor of a battery system comprising a first battery pack that comprises a first battery cell and a second battery pack that comprises a second battery cell, causes the battery system to operate, wherein the operation comprises:

sequentially performing constant current (CC) charging on the second battery pack and the first battery pack based on input power being identified; and sequentially performing constant voltage (CV) charging on the first battery pack and the second battery pack based on the CC charging of the second battery pack and the first battery pack being completed, wherein a discharging performance of the first battery pack is greater than a discharging performance of the second battery pack, and wherein a charging performance of the second battery pack is greater than a charging performance of the first battery pack, and wherein the battery system further comprises:

a first DC/DC converter, for a first load, connected to the first battery pack;

a second DC/DC converter, for a second load, connected to the second battery pack;

a power supplier;

a first switching element connected between the power supplier and the charger;

a first resistance connected to a first terminal of the first DC/DC converter;

a second switching element connected to the first resistance;

a third switching element connected between the first terminal of the first DC/DC converter and the charger;

a fourth switching element connected between a first terminal of the second DC/DC converter and the charger;

a second resistance connected to a first terminal of the first switching element between the third switching element and the fourth switching element;

a third resistance connected to the first terminal of the second DC/DC converter; and a fifth switching element connected to the third resistance.

15. The operation of claim 14, further comprising sequentially discharging the second battery pack and discharging the first battery pack by turning on the first DC/DC converter and the second DC/DC converter, based on input power being not identified.

16. The operation of claim 14, wherein the battery system further comprises:

a sixth switching element connected between the first DC/DC converter and the charger; and a seventh switching element connected between a second terminal of the second DC/DC converter and the charger, wherein the first battery pack is connected between a second terminal of the first DC/DC converter and the sixth switching element, and wherein the second battery pack is connected between the second terminal of the second DC/DC converter and the seventh switching element.

17. The operation of claim 15, further comprising:

monitoring an output current of a first load connected to a second terminal of the second switching element through the first resistance connected to a first terminal of the second switching element;

monitoring an output current of a second load connected to a second terminal of the fifth switching element through the third resistance connected to the first terminal of the fifth switching element; and controlling the first battery pack and the second battery pack to be discharged based on the output current of the first load and the output current of the second load.

* * * * *